United States Patent Office 3,419,797
Patented Dec. 31, 1968

3,419,797
NONDESTRUCTIVE EDDY CURRENT TESTING DEVICE FOR TESTING METAL TUBING AND INSTANTANEOUSLY DISPLAYING THE CROSS SECTION OF SAID TUBING
Hugo L. Libby, Richland, Wash., assignor to the United States of America as represented by the United States Atomic Energy Commission
Filed Jan. 21, 1966, Ser. No. 522,325
6 Claims. (Cl. 324—40)

The invention described herein was made in the course of, or under a contract with, the United States Atomic Energy Commission.

This invention relates to nondestructive eddy current testing devices and more particularly to eddy current nondestructive testing devices for nondestructively testing metal tubing.

As present technology becomes more complex and the requirements for flaw-free material increase, the requirements for improved nondestructive testing equipment increase. For example, in the nondestructive testing of metal tubing it is desirable for the operator to see an instantaneous display of the cross section of the tubing as it passes before him, showing wall thickness and the relative location and depth of cracks or subsurface flaws therein. No known existing device will accomplish this function.

Accordingly, it is one object of the present invention to provide an improved eddy current device for the nondestructive testing of metal tubing.

It is another object of the present invention to provide a nondestructive testing device capable of instantaneously displaying the cross section of metal tubing, showing wall thickness thereof and the relative location of cracks or subsurface flaws therein.

It is another object of the present invention to provide an eddy current nondestructive testing device capable of instantaneously displaying the cross section of metal tubing, showing the wall thickness thereof and the relative location and depth of cracks or subsurface flaws therein, even when two flaws are simultaneously in the field of the eddy current probe coil.

Other objects of the present invention will become more apparent as the general description proceeds.

In general, the present invention comprises an eddy current probe coil with means for rotating the probe coil about the interior or exterior surface of metal tubing. Means are provided for applying a multidimensional excitation current to the probe coil and for expanding the received signal from the probe coil into individual components, each of the components representing an individual variable parameter of the tubing. An oscilloscope is provided with means for rotating the radial sweep of the oscilloscope synchronously with the rotation of the probe coil. Means are provided synchronized with the radial sweep of the oscilloscope for producing pulses, each pulse having a sweep time generation position proportional to the amplitude of an associated one of said individual component signals. Means are further provided for sequentially applying each of these pulses to successive radial sweeps of said oscilloscope to cause unblanking thereof at the time position of the applied pulse.

Further understanding of the present invention may best be obtained from consideration of the accompanying drawings wherein.

Figure 1:
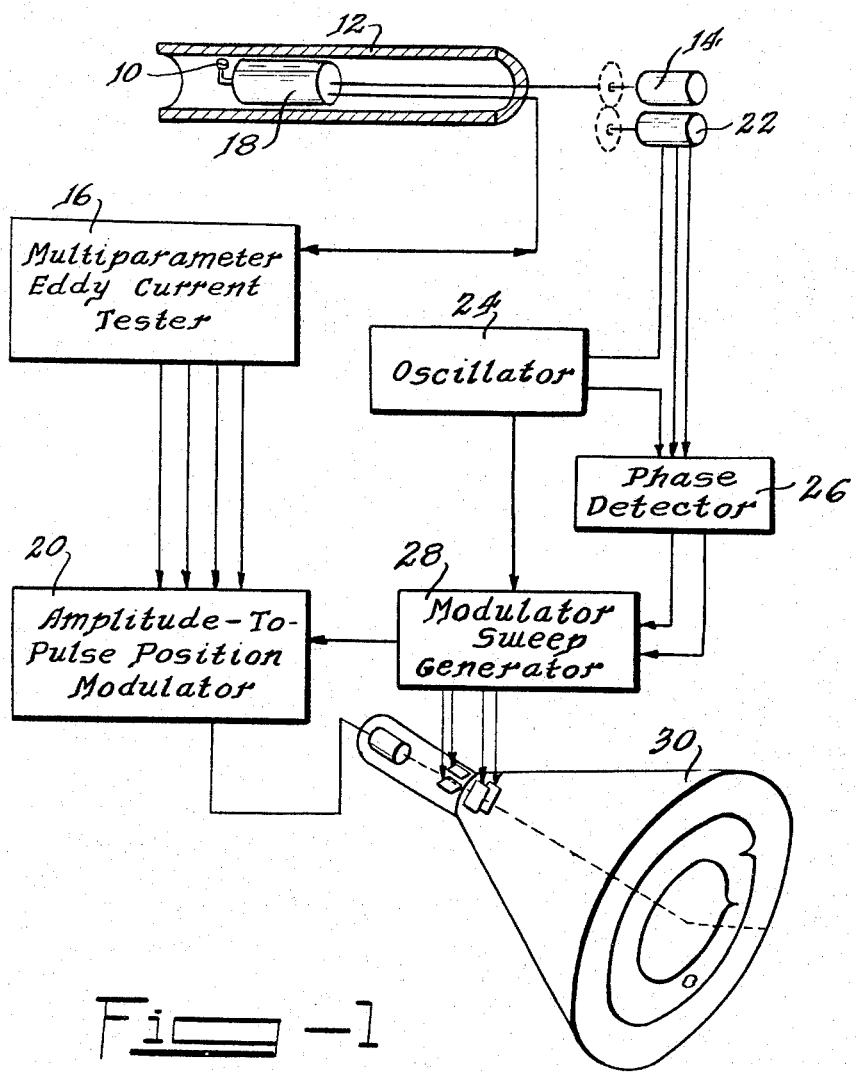
FIG. 1 is a schematic diagram of an apparatus for the practice of the present invention.

The general embodiment of an apparatus for the practice of the present invention is illustrated in FIG. 1. An eddy current probe coil 10 is mounted so as to be rotatable within a metal tube 12. A motor drive unit 14 is connected to eddy current probe coil 10 so as to cause rotation thereof. A multiparameter eddy current testing device 16, of the type described in U.S. application Ser. No. 227,693, now Patent No. 3,229,198 by H. L. Libby, is electrically connected via a coupling device 18 to the eddy current probe coil 10. The coupler 18, electrically connecting the multiparameter testing device 16 to the eddy current probe coil 10, is of conventional design, such as an electric transformer having a rotating secondary winding or a device utilizing slip ring assemblies.

The multiparameter testing device 16 excites the eddy current coil 10 with a multidimensional excitation current and derives from the output of the eddy current probe coil 10 a plurality of signals, each of which is representative of a particular parameter of the metal tubing 12. A multidimensional excitation current is defined in the aforementioned Libby patent to be a current represented by a superposition of more than two basis functions having prescribed amplitudes. Each basis function corresponds to a dimension of the excitation current. The basis functions are the characteristic functions of a generalized Fourier series expansion of the excitation current. For the purposes of this definition the word "multidimensional" means more than two dimensions. As the probe 10 is rotated within the metal tube 12, each of the output signals from the multiparameter testing device 16 will vary in amplitude responsive to variations in the associated parameter being monitored. The output signals from the multiparameter eddy current testing device 16 are fed to an amplitude-to-pulse-position modulator 20. The amplitude-to-pulse-position modulator 20 accepts the separate output signals from the multiparameter eddy current testing device 16 and periodically generates for each output signal a pulse which is generated in time, dependent upon the amplitude of the signal. The modulator 20 multiplexes these pulses.

A sine-cosine resolver 22 is mechanically coupled to the motor drive unit 14 so as to be rotatable therewith. A sine wave oscillator 24 electrically excites the resolver 22. The output of resolver 22 is fed via phase detector 26 to the input of a modulator-sweep generator 28. The modulator-sweep generator 28 gives an output which comprises a series of vertical and horizontal deflection voltages modulated with the sine-cosine drive shaft angle information derived by resolver 22. These vertical and horizontal deflection output voltages of modulator-sweep generator 28 are applied to the vertical and horizontal deflection plates of an oscilloscope 30 to provide the rotating radial sweep therefor. Thus, the rotation of the rotating radial sweep of oscilloscope 30 is synchronized with the rotation of the eddy current probe coil 10 within the metal tubing 12 and the angular position of the radial sweep of the oscilloscope 30 at any one instant is determined by the angular position of the eddy current probe coil 10. The radial sweep of the oscilloscope is derived from a square wave generator within the modulator-sweep generator 28 and should have a sweep time which is short compared to the rotational sweep time of the eddy current test probe 10.

As stated supra, the output parameter signals from multiparameter testing device 16 are converted to time-dependent pulses and multiplexed by amplitude-to-pulse-position modulator 20. This multiplexed signal from circuit 20 is fed to oscilloscope 30 to cause unblanking of the cathode ray beam. The square wave generator within the modulator-sweep generator 28 furnishes a synchronizing signal to the amplitude-to-pulse-position modulator 20 wherefrom the rate at which the multiparameter output signals are converted to time-dependent pulses by the modulator 20 is determined. For each radial sweep of the oscilloscope beam, each parameter signal is sampled and the amplitude thereof converted to a time-dependent pulse. These time-dependent pulses derived from the parameter signals during the period of the radial sweep are multiplexed and applied to the oscilloscope 30 to unblank portions of the radial sweep during which they were generated. Thus, as they eddy current coil 10 rotates within the metal tube 12, defects within the walls of the tube together with the relative location of the inner and outer tube wall surfaces are thus converted to time-dependent electrical signals which, in turn, unblank the synchronously sweeping beam of an oscilloscope to present a pictorial display thereof.

Figure 2:
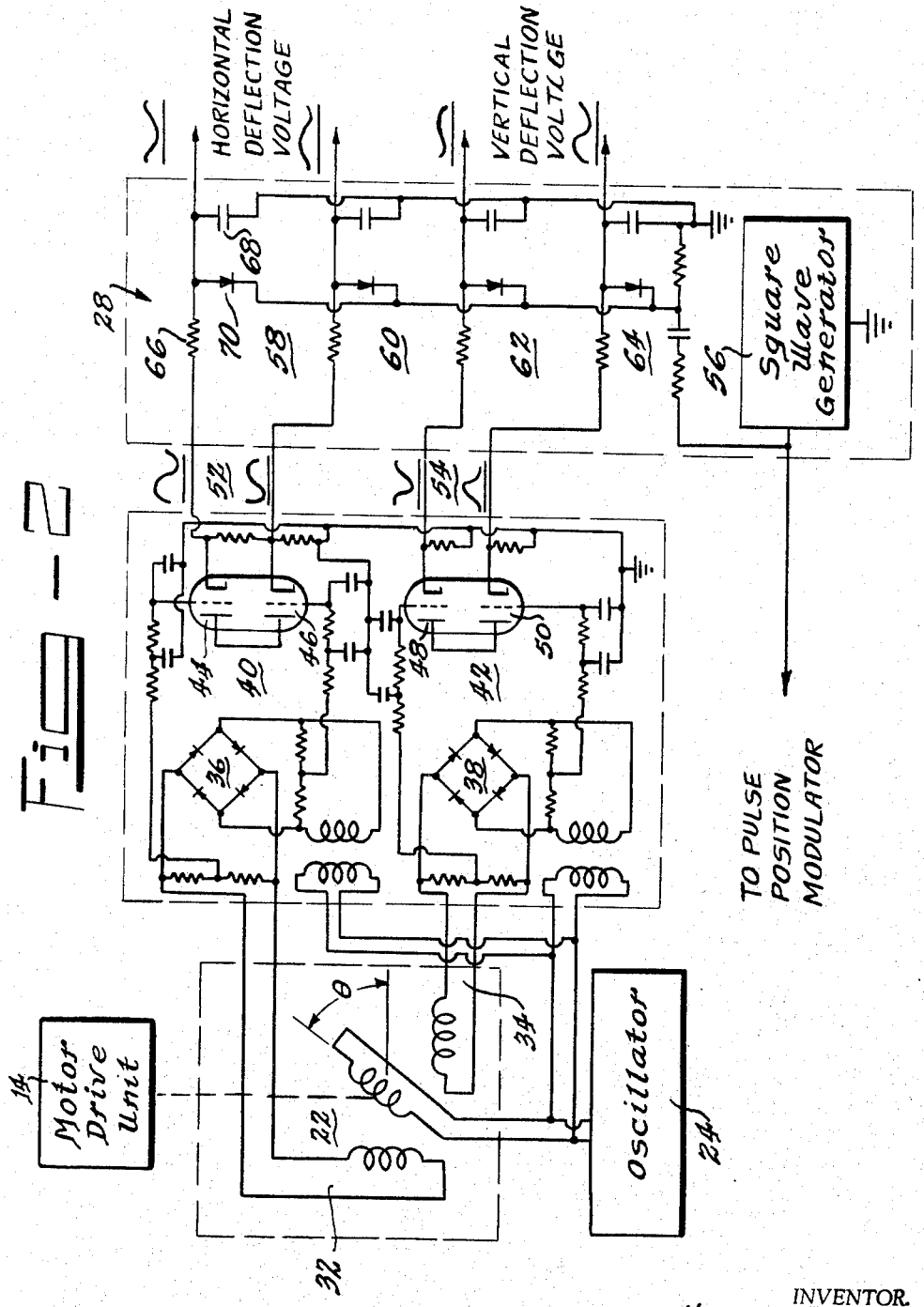
FIG. 2 is a detailed schematic diagram of a portion of the apparatus of FIG. 1.

A detailed embodiment for the apparatus used to generate the rotating radial sweep of oscilloscope 30 in FIG. 1 is shown in FIG. 2. The rotor of resolver 22, as stated supra, is driven mechanically by the motor drive mechanism 14, so that the shaft angle $\theta$ of resolver 22 represents the angular position of the eddy current probe coil 10. The rotor of the resolver 22 is electrically excited by the oscillator 24. The outputs 32 and 34 of the two stator windings of the resolver 22 are applied to two ring demodulator (phase detector) circuits 36 and 38. The resolver excitation oscillator 24 provides the reference switching signal for the phase detectors 36 and 38. The balanced outputs of the two phase detectors 36 and 38 are passed through low pass filters 40 and 42 and then applied to cathode follower amplifiers 44, 46, 48 and 50, resulting in balanced output signals at points 52 and 54 which vary as the rotor of resolver 22 turns. The signal at point 52 varies in proportion to the sine of the shaft position angle $\theta$ and the signal at point 54 varies in proportion to the cosine of the shaft position angle $\theta$. Thus, the voltages at points 52 and 54 are essentially direct-current voltages, varying as a function of the shaft position of resolver 22. These signals also have a fixed direct-current component due to the fixed output of the associated cathode follower amplifiers 44, 46, 48 and 50. Due to the direct-current nature of the signals, an output exists in general, even when the shaft of resolver 22 is stationary. Thus, the signals at points 52 and 54 give information of the position of the coil 10 while it is rotating or at rest, but do not give directly the signals required for the desired rotating radial sweep of oscilloscope 30. If the signals were applied to the horizontal and vertical deflection inputs of oscilloscope 30, the rotation of the shaft of resolver 22 would cause the beam spot to move in a circular path, representing the rotation of probe coil 10. This gives a circular trace but does not provide the required radial deflection. Radial motion for the oscilloscope 30 is generated by the modulator-sweep generator 28 from the shaft position signals at points 52 and 54.

The modulator-sweep generator 28 comprises a square wave generator 56 and four identical radial deflection-voltage-generating circuits 58, 60, 62 and 64. Each of the deflection-voltage-generating circuits 58, 60, 62 and 64 perform a similar function except that the phase of the shaft position signals applied to each is different. For simplicity of explanation, deflection circuit 58 will be described, it being understood that the other circuits operate in like manner. The deflection circuit 58 comprises a resistor 66, a charge capacitor 68 and a discharge diode 70. The deflection circuit 58 has its input from one side of the shaft position balanced signal at point 52.

The output of the square wave generator 56 is applied to the cathode of diode 70 and, during the period when the square wave polarity output from generator 56 is negative, diode 70 conducts to discharge capacitor 68. The voltage input to the deflection circuit 58, although having an A-C component as the shaft of resolver 22 rotates, is always positive due to its source being the cathode follower amplifier 44. When the square wave output signal of generator 56 enters its positive half-cycle, diode 70 is abruptly switched off and capacitor 68 commences charging due to the current flowing through resistor 66 which was previously shunted to ground through diode 70. The time constant of deflection circuit 58 ($R_{66}C_{68}$) is made long compared to the period of the square wave output of generator 56, so that capacitor 68 charges at a nearly linear rate. The charging rate varies with the shaft position voltage at point 52. The charging and discharging sequence of capacitor 68 via diode 70 results in a saw-tooth waveform output for circuit 58. The amplitude of the saw-tooth is proportional to the amplitude of the charging sine wave at the time of charging. Since charging and discharging for all of the circuits 58, 60, 62 and 64 are done simultaneously, the amplitudes of the respective saw-tooth waveform outputs therefor will be different since each of the sine and cosine generating signals are out of phase with each other. With the shaft of resolver 22 rotating, the individual saw-tooth waveforms generate a sinusoidal envelope for each output of the circuits 58, 60, 62 and 64.

Deflection circuits 58 and 60 provide the horizontal deflection voltage and deflection circuits 62 and 64 provide the vertical deflection voltage for the oscilloscope 30. The square wave generator 56 also has its output connected to the amplitude-to-pulse-position modulator circuit 20 to provide synchronous operation therewith. When the deflection voltages from circuits 58, 60, 62 and 64 are applied to the appropriate plates of oscilloscope 30, the beam thereof is caused to have a radial deflection, and, upon rotation of the eddy current probe coil 10, a rotating radial sweep.

Figure 3:
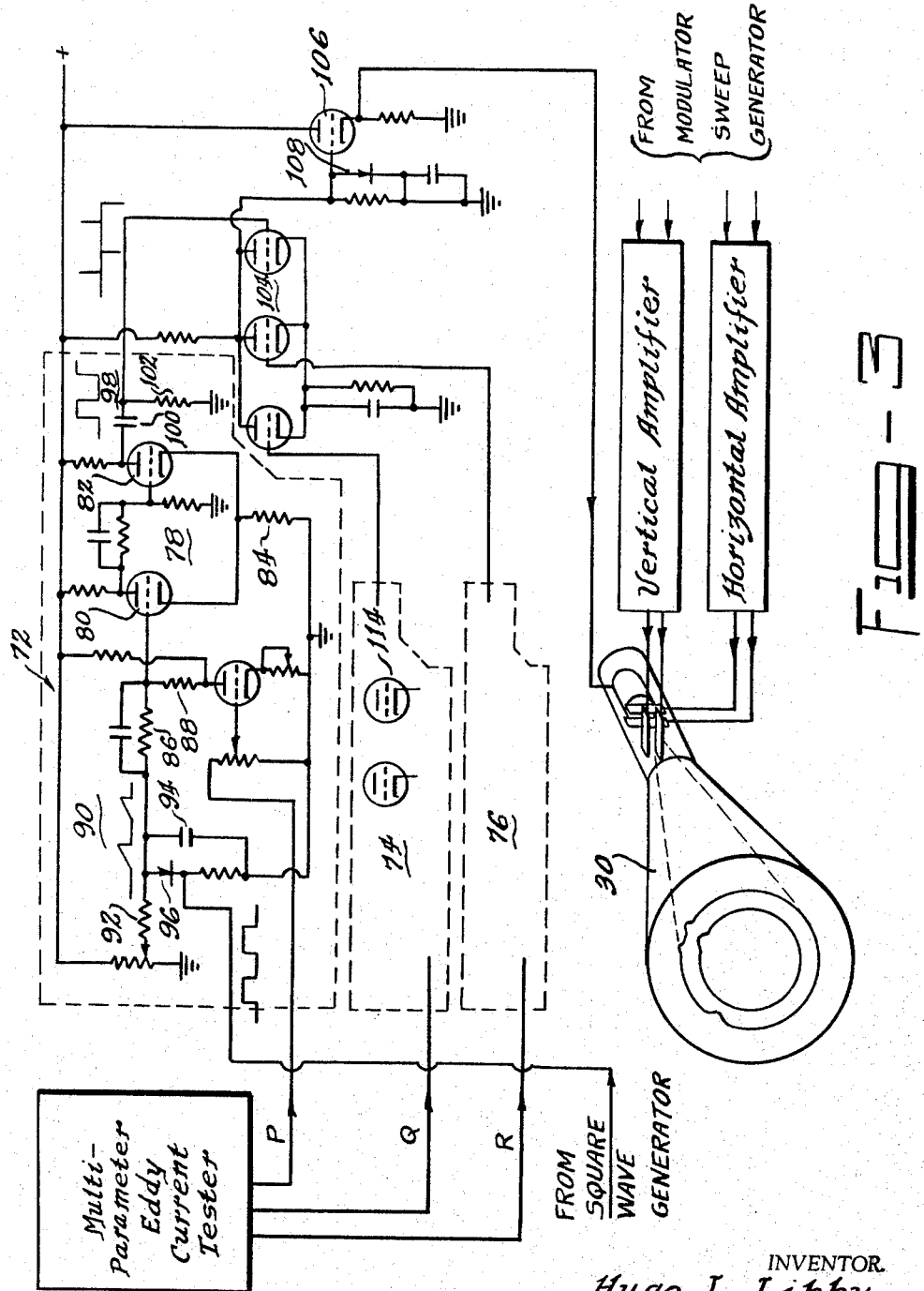
FIG. 3 is a detailed schematic diagram of a portion of the apparatus of FIG. 1.

Referring to FIG. 3, a detailed schematic is shown for the amplitude-to-pulse-position modulator circuit 20 of the embodiment of FIG. 1. As hereinbefore described, the amplitude-to-pulse-position modulator circuit 20 accepts the amplitude-varying outputs of the multiparameter testing device 16. For purposes of explanation, three parameter variables are illustrated and hereinafter the signals therefor are referred to as parameter signals P, Q and R. These parameter signals vary slowly in comparison to the high radial sweep rate of oscilloscope 30 and produce multiplexed output pulses which vary in time position in accordance with the amplitudes of the signals P, Q and R. A detailed schematic of only one modulator section 72 within modulator circuit 20 is shown. It is to be understood that the other modulator sections 74 and 76 operate in a similar manner and are constructed similarly thereto. It is to be further understood that for each parameter tested an individual modulator section is required therefor.

Modulator section 72 comprises a Schmitt trigger circuit 78 which has two stable states. In the first stable state, tube 80 is not conducting and tube 82 is conducting. In the second stable state, tube 80 is conducting and tube 82 is not conducting. In the first stable state, the voltage across resistor 84 is sufficient to cause tube 80 to be not conducting whenever the grid voltage of tube 80 is below a threshold value. When the grid voltage of tube 80 approaches this threshold value, tube 80 starts to conduct, causing its plate voltage to drop which, in turn, causes the grid voltage of tube 82 to decrease. This lowers the conduction of tube 82 which, in turn, lowers the voltage drop across resistor 84 and causes further increased conduction of tube 80. This regenerative action quickly causes tube 80 to become highly conducting and tube 82 to be cut off, resulting in a rapid rise of the plate voltage of tube 82. This state is maintained as long as the grid of tube 80 is held above the threshold value. When the grid of tube 80 is lowered somewhat below the threshold value, a reverse action takes place and the circuit returns to its previous state with tube 80 not conducting and tube 82 conducting.

The pulse-position modulation for section 72 is obtained by applying the sum of a fixed saw-tooth voltage and the output of one channel of the multiparameter testing device 16 through summing resistors 86 and 88 to the grid of tube 80. The saw-tooth voltage is generated by means of the charge-discharge network 90 (comprising resistor 92, capacitor 94 and diode 96) which operates in a manner similar to the modulator-sweep generator 28 previously described and shown in FIG. 2. The output of the saw-tooth generator 90 is applied to the grid of tube 80 through the summing resistor 86. The saw-tooth signal from generator 90 and the output signal from modulator-sweep generator 28 are in synchronism, as both generators are driven from the square wave generator 56. The output from the multiparameter testing device 16 varies slowly in comparison to the saw-tooth signal and thus may be considered to be constant during one saw-tooth cycle. Thus, the constant saw-tooth signal is superimposed on the slowly varying multiparameter tester signal at the grid of tube 80. This causes the time at which the Schmitt trigger circuit changes state to be a function of the value of the signal from the multiparameter testing device 16. For a positive multiparameter tester signal, an increase in signal level will cause the Schmitt trigger circuit to change state at an earlier moment during the saw-tooth voltage ramp. This causes the leading edge of the rectangular voltage output of tube 82 to change position. The output waveform from tube 82 is shaped by differentiating circuit 98 (comprising capacitor 100 and resistor 102) and applied to summing amplifier 104. The summing amplifier 104 permits multiplexing of the signal from modulator section 72 with the signal from modulator sections 74 and 76. The output of the summing amplifier 104 is applied to a cathode follower 106 which provides the final negative unblanking signals which are applied to the cathode of the cathode ray oscilloscope 30. Diode 108 limits the positive going portions of the signal.

Figure 4:
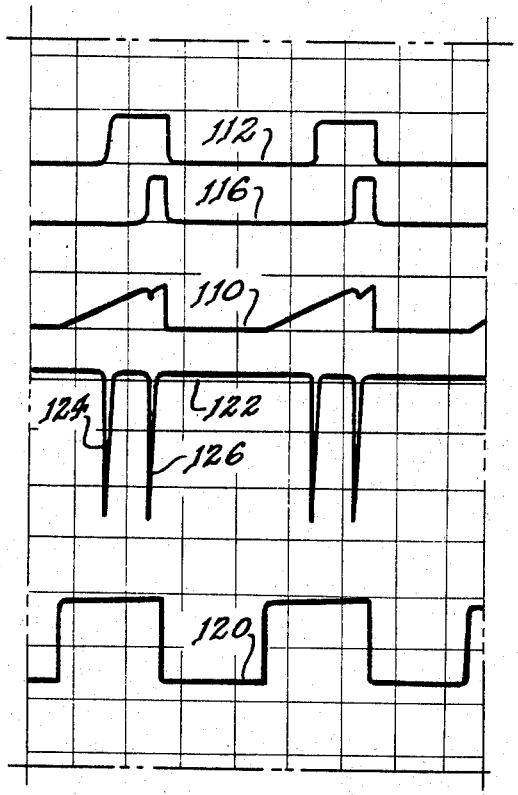
FIG. 4 is an oscilloscope display of waveforms of modulator sections within the amplitude-to-pulse-position modulator of FIG. 3.

Typical waveforms of the modulator sections 72 and 74 are shown in FIG. 4. The trace 110 shows the saw-tooth waveform at the grid of tube 80. The D-C level of the saw-tooth signal is made to vary as a function of the value of the parameter P, thus determining the point in time at which the Schmitt trigger circuit changes state. The trace 112 shows the waveform at the plate of tube 82. In this case, the Schmitt trigger circuit changed state at a time approximately 40 microseconds after the saw-tooth ramp started. The output at the plate of tube 114 in the second modulator section 74 (driven by the parameter Q signal) is shown in trace 116. In this case, the Schmitt trigger circuit changed state at a time approximately 85 microseconds after the start of the saw-tooth ramp. For this signal, the waveform at the grid of tube 118 would be the same as that at the grid of tube 80 except that the D-C level of the saw-tooth would be lower, causing the circuit change of state to occur later in the cycle. This difference is due to the different value of the parameter signal Q as compared to the parameter signal R. The square wave gate signal from square wave generator 56 used to switch all of the saw-tooth generator diodes is shown in trace 120. Trace 122 shows multiplexed signals at the cathode of tube 106. The two signals per cycle in trace 122 correspond to the inverted positive going wave front at the plates of tubes 82 and 114. These signals are used to unblank the cathode ray beam of oscilloscope 30, which beam is being swept radially from the center of the screen outward due to the saw-tooth deflection voltage generated by the modulator-sweep generator 28. The first, 124, of the two signals shown in trace 122 represents the inner surface of the metal tubing 12 and the second, 126, represents the outer surface of the tubing 12.

Figure 5A:
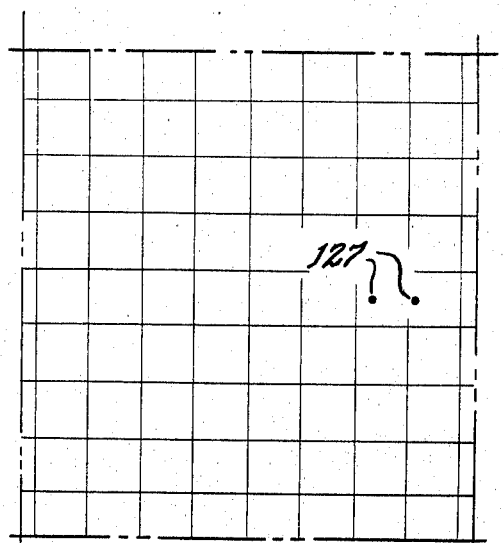
FIG. 5 is an oscilloscope display from the apparatus of FIG. 1 when used on flawless uniform metal tubing.
Figure 5B:
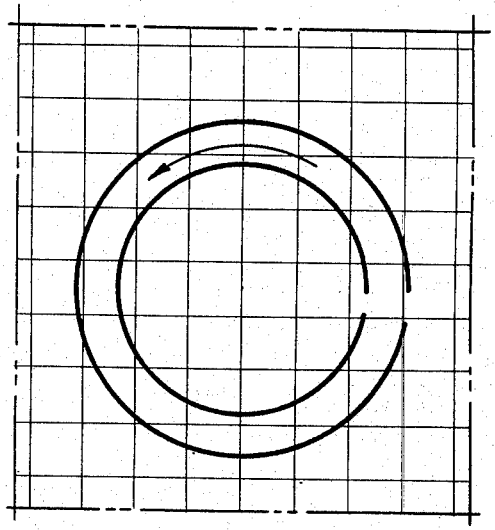

As previously described, the angle at which each radial sweep appears on the display of oscilloscope 30 depends upon the position of the shaft of resolver 22 at that particular time. Thus, as the shaft of resolver 22 rotates, the radial sweep rotates. The two spots resulting from the unblanking of the beam of the oscilloscope 30 due to the multiplexed signals at the cathode of tube 106, as shown in FIG. 4, produce two circular loci on the screen of the oscilloscope 30 as the radial sweep rotates in synchronism with the shaft of resolver 22 and eddy current test probe coil 10. The generation of these patterns is illustrated in FIG. 5. In FIG. 5A, the eddy current test probe coil 10 was stationary; thus, the radial sweep angle was constant and the resulting pattern is simply two spots 127 representing the inner and outer surfaces of the metal tubing 12 at that position. In FIG. 5B, the eddy current test probe coil 10 was rotated slowly from the position in FIG. 5A for approximately 350°. The two multiplexed unblanking signals producing this pattern were spaced closer together in time than the signals shown in FIG. 4. A similar pattern produced by the signals in FIG. 4 would appear as a tubing cross section with a much thicker wall.

It is to be noted that in the apparatus hereinbefore described the eddy current test probe coil 10 has been shown to be rotating and a coupling device utilized to electrically couple the coil to the multiparameter testing device 16. It is to be understood that instead of the eddy current test probe coil 10 rotating, the metal tubing 12 may be rotated, with the eddy current probe coil 10 being held stationary. It is to be further understood that instead of unblanking the display of the oscilloscope 30, the signal from the amplitude-to-pulse-position modulator 20 may be used to blank out the oscilloscope display to illustrate tubing cross section and flaws.

Reference is made to FIG. 6 wherein is shown a dynamic oscilloscope display of the cross section of a piece of type 304 stainless steel tubing obtained with the apparatus hereinbefore described. The tubing was 2¾ inches outside diameter with ⅛-inch wall thickness and had artificial flaws made by drilling ⅛-inch diameter holes to depths ranging from .012 to .062 inch. The multiparameter testing device 16 was operated at 70 kc. and 250 kc. simultaneously to obtain the multidimensional excitation current. The transformation section of the multiparameter testing device 16 was adjusted to give readouts of outer surface flaws and inner surface flaws essentially independent of probe wobble on separate channels. In this test, the probe wobble information was not used. A tangent type test coil was used and the tube 12 was rotated. The rotating radial sweep was generated as hereinbefore described, with tube position information being obtained from the sine-cosine resolver.

Figure 6A:
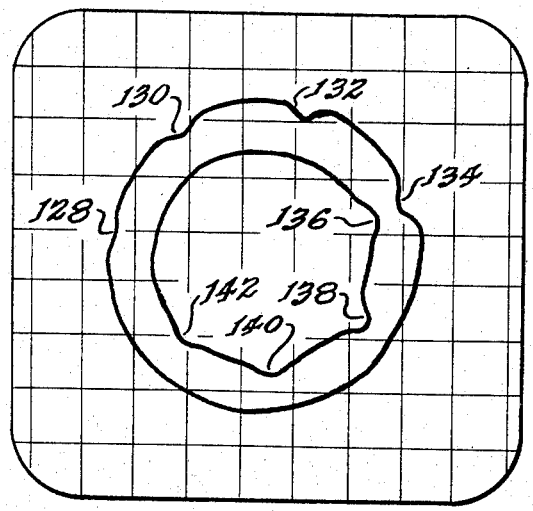
FIG. 6 is an oscilloscope display from the apparatus of FIG. 1 when used on metal tubing having artificial flaws therein.
Figure 6B:
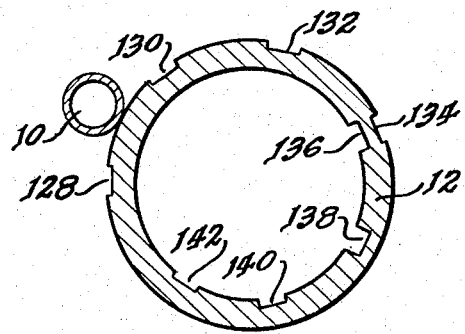

The artificial flaws of FIG. 6A and their corresponding positions in the dynamic display shown in FIG. 6B were sized as follows:

| Flaw: | Depth, inches |
|---|---|
| 128 | .004 |
| 130 | .008 |
| 132 | .012 |
| 134 | .012 |
| 136 | .04 |
| 138 | .062 |
| 140 | .035 |
| 142 | .020 |

It is to be noted that the apparatus was capable of detecting and displaying flaws 134 and 136 even though these flaws were opposite each other in the wall surface of the tubing 12 and therefore were present in the field of the eddy current probe coil 10 at the same instant of time.

Persons skilled in the art will, of course, readily adapt the general teachings of the invention to embodiments far different than the embodiments illustrated. Accordingly, the scope of the protection afforded the invention should not be limited to the particular embodiment illustrated in the drawings and described above, but should be determined only in accordance with the appended claims.

The embodiments of the invention in which an exclusive property or privilege is claimed are defined as follows:

1. An eddy current nondestructive testing device for testing metal tubing comprising a probe coil, means for rotating said probe coil with respect to a surface of said metal tubing, means for applying a multidimensional excitation current to said probe coil, means for expanding the received signal of said probe coil into individual components, each of said components representing an individual parameter of said tubing, an oscilloscope having a blanked radial sweep, means for rotating the radial sweep of said oscilloscope synchronously with the rotation of said probe coil, means synchronized with the radial sweep of said oscilloscope for sampling during the period of each radial sweep of said oscilloscope each of said component signals to produce from each component signal a pulse having a time of generation proportional to the amplitude of the associated component signal, means for multiplexing said pulses generated during each radial sweep of said oscilloscope and means for applying said multiplexed pulses to said oscilloscope to cause at the time position of said pulses unblanking of the radial sweep of said oscilloscope during which said multiplexed pulses were generated.

2. The device according to claim 1 wherein said oscilloscope has an unblanked radial sweep and said multiplexed pulse applying means apply said multiplexed pulses to said oscilloscape to cause blanking thereof at the time position of said pulses of the radial sweep of said oscilloscope during which said multiplexed pulses were generated.

3. The device according to claim 1 wherein said means for synchronously rotating the radial sweep of said oscilloscope comprise means for generating first and second signals one hundred and eighty degrees out of phase with respect to each other and which vary as the sine of the angular rotational position of said probe coil, means for generating third and fourth signals one hundred and eighty degrees out of phase with respect to each other and which vary as the cosine of the angular rotational position of said probe coil, means for generating fifth, sixth, seventh and eighth saw-tooth waveform signals, each being amplitude modulated by an associated one of said first, second, third and fourth signals, means for applying said fifth and sixth signals to the horizontal deflection plates of said oscilloscope and means for applying said seventh and eighth signals to the vertical deflection plates of said oscilloscope.

4. The device according to claim 3 wherein said fifth, sixth, seventh and eighth signal generating means comprise means for generating a square waveform signal, four like capacitors, means for connecting each of said capacitors across an associated one of said first, second, third and fourth signals during the positive portions of said square waveform signal, and means for rapidly discharging each of said capacitors responsive to the negative portions of said square waveform signal, whereby the output of each of said capacitors is a saw-tooth waveform siginal amplitude modulated by an associated one of said first, second, third and fourth signals.

5. The device according to claim 1 wherein said means for generating pulses from each of said component signals comprise a plurality of bistable pulse generator means equal in number to said component signals, means for applying each of said component signals to the input of an associated one of said bistable pulse generator means, means for generating a plurality of like saw-tooth waveform signals equal in number to said component signals and synchronized with the rotating radial sweep of said oscilloscope, means for applying each of said plurality of like saw-tooth waveform signals to the input of an associated one of said bistable pulse generator means, whereby each of said like saw-tooth waveform signals is superposed on an associated component signal to control the state of the associated bistable pulse generator therefor, whereby pulse outputs are obtained from each of said bistable pulse generator means having a time of generation proportional to the amplitude of the component signal associated therewith.

6. An eddy current nondestructive testing device for testing metal tubing comprising a probe coil, means for mounting said probe coil within said tube so as to be rotatable with respect thereto, motor means connected to said probe coil to cause rotation thereof, means for generating first and second signals one hundred and eighty degrees out of phase with respect to each other and which vary as the sine of the angular rotational position of said probe coil, means for generating third and fourth signals one hundred and eighty degrees out of phase with respect to each other and which vary as the cosine of the angular rotational position of said probe coil, means for generating a square waveform signal, four like capacitors, means for connecting each of said capacitors across an associated one of said first, second, third and fourth signals during the positive portions of said square waveform signal, means for rapidly discharging each of said capacitors responsive to negative portions of said square waveform signal, whereby the output of each of said capacitors is a saw-tooth waveform signal amplitude modulated by an associated one of said first, second, third and fourth signals, an oscilloscope having a blanked radial sweep, means for applying the saw-tooth waveform output signals of said capacitors to the deflection plates of said oscilloscope to generate a rotating radial sweep therefor synchronized with the rotation of said probe coil, means for applying a multidimensional signal to said probe coil, means for expanding the received signal of said probe coil into individual components each representing an individual parameter of said tubing, a plurality of like bistable pulse generator means equal in number to said component signals, means for applying each of said component signals to the input of an associated one of said bistable pulse generator means, means driven by said square waveform signal generating means for generating a plurality of like saw-tooth waveform signals equal in number to said component signals, means for applying each of said plurality of like saw-tooth waveform signals to the input of an associated one of said bistable pulse generator means to superpose each of said like saw-tooth waveform signals on an associated component signal to control the state of switching of the associated bistable pulse generator therefor, whereby pulse outputs are obtained from each bistable pulse generator means having a time of generation proportional to the amplitude of the component signal associated therewith, means for multiplexing the output pulses of said bistable pulse generator means, and means for applying each of said multiplixed pulses to said oscilloscope to cause unblanking of the rotating radial sweep thereof at the time position of each of said multiplexed pulses.

References Cited

UNITED STATES PATENTS

| | | | |
|---|---|---|---|
| 2,878,446 | 3/1959 | Price et al. | 324—37 |
| 2,894,203 | 7/1959 | Cory | 324—40 |
| 3,135,914 | 6/1964 | Callan et al. | 324—40 |
| 3,229,198 | 1/1966 | Libby | 324—40 |

RUDOLPH V. ROLINEC, *Primary Examiner.*

R. J. CORCORAN, *Assistant Examiner.*